United States Patent [19]

Koike et al.

[11] Patent Number: 5,524,257
[45] Date of Patent: Jun. 4, 1996

[54] METHOD OF PARALLEL PROCESSING FOR INFERENCE AND A SYSTEM THEREFOR

[75] Inventors: Hiroshi Koike, Machida; Kazuyoshi Tanaka, Sagamihara, both of Japan

[73] Assignees: Hitachi, Ltd., Tokyo; Hitachi Seibu Software, Ltd., Oosaka, both of Japan

[21] Appl. No.: 5,591

[22] Filed: Jan. 19, 1993

[30] Foreign Application Priority Data

Jan. 23, 1992 [JP] Japan .................................. 4-010366

[51] Int. Cl.$^6$ ........................... G06F 7/16; G06F 15/16; G06F 15/18
[52] U.S. Cl. .................. 395/800; 364/229.5; 364/230.5; 364/264.7; 364/266.4; 364/269.4; 364/271.3; 364/270.7; 364/274.7; 364/274.5; 364/274.3; 364/274.71; 364/277; 364/DIG. 1; 364/DIG. 2; 395/10; 395/50
[58] Field of Search ..................... 395/800, 600, 395/650, 575, 500, 200, 325, 375, 775, 400, 425, 725, 51, 64, 11, 50, 3, 10, 13, 22, 60, 61, 63; 364/140, 131, DIG. 1, DIG. 2, 141, 134, 807, 132; 371/69.1, 68.1, 19, 68.3

[56] References Cited

U.S. PATENT DOCUMENTS

| | | | |
|---|---|---|---|
| 3,577,185 | 5/1971 | Belady | 395/425 |
| 4,532,584 | 7/1985 | Federico et al. | 364/140 |
| 4,783,738 | 11/1988 | Li et al. | 395/800 |
| 4,881,178 | 11/1989 | Holland et al. | 395/51 |
| 4,956,791 | 9/1990 | Lee et al. | 395/51 |
| 4,965,882 | 10/1990 | Barabash et al. | 395/51 |
| 5,243,607 | 9/1993 | Masson et al. | 371/69.1 |

OTHER PUBLICATIONS

Takeuchi, Takuji, et al. "A Parallel Matching Algorithm for Production System and Its Evaluation Using a Multiprocessor," Bulletin of Information Processing Society of Japan, vol. 30. No. 4, Apr. 1989, pp. 486–494. (Japanese).

Ishida, Toru. "Parallel Execution of Production Systems," (Yokosuka Electrical Communication Laboratory, NTT), vol. 26, No. 3, Mar. 1985, pp. 213–225. (Japanese).

Ishida, Toru, et al. "Art of Performance Improvement in Production Systems," (Communications and Information Processing Laboratories, NTT), vol. 29, No. 5, May 1988, pp. 467–477. (Japanese).

*Primary Examiner*—Daniel Pan
*Attorney, Agent, or Firm*—Fay, Sharpe, Beall, Fagan, Minnich & McKee

[57] ABSTRACT

The same data is processed in parallel by a plurality of different algorithms for deriving the same processing result from the same data. When an algorithm derives a processing result first, the processing result is used and the processing by the other algorithms is stopped or interrupted and updated to the same data which is reflected by the processing result data. This updated data is processed in parallel once again by a plurality of different algorithms, and when an algorithm derives another processing result first, the processing result is used, and the above processing is repeated, and inference. Consequently, sorting, data compression, simulation, and neurolearning can be processed at the highest possible speed.

4 Claims, 9 Drawing Sheets

FIG. 2

```
 51
(RULE 1
    IF
        (FACT 1    @a  =   1)
        (FACT 2    @b  ->  ? x)
    THEN
        (FACT 3    @c  :=  3 + ? x)
)
```
EXAMPLE OF RULE DESCRIPTION
— 1000
— 1001 CONDITION PART
— 1002 THEN PART

```
(RULE 2
    IF
        (FACT 3    @c  ->  ? x)
        (FACT 1    @a  >   ? x + 1)
    THEN
        (FACT 4    @a  :=  2* ? x)
)
```
— 1000
— 1001
— 1002

EXAMPLE OF FACT DESCRIPTION

```
(FACT 1     @a      1)
(FACT 2     @b      5)
(FACT 3     @c      0)
(FACT 4     @a      0)
```
— 1003
— 1003
— 1003
— 1003

METHOD OF PARALLEL PROCESSING FOR INFERENCE AND A SYSTEM THEREFOR

BACKGROUND OF THE INVENTION

1. Field of the Invention

The present invention relates to a concurrent processing method and system and more particularly to a concurrent processing method and system which are suitable for high speed inference or sorting.

2. Description of the Prior Art

The concurrent processing method and system are a method and system for concurrently executing a plurality of processes for deriving the same processing result from the same data.

With respect to conventional concurrent processing systems, fault tolerant and highly reliable system are well known.

A fault tolerant system is directed to processing data by a main processor group, and concurrently processing the same data with the same algorithm by a sub-processor group, and backing up the processing by the sub-processor group when the main processor group goes down so as to prevent the processing from stopping. It is indicated, for example, in "Fault Tolerant System (McGraw-Hill Books, Ltd., 1986).

A highly reliable system is directed to processing the same data by a plurality of processor groups using the same algorithm and matching results derived by the processor groups so as improve the reliability of the derived results.

A parallel processing system exists wherein a portion of a job is allotted to each processor and accomplished in parallel. In the concurrent processing system, even when one processing is stopped, processing results can be derived by another processing. However, in the parallel processing system, when one processing is stopped, processing results cannot be derived. Therefore, the two systems are different in kind from each other.

Next, conventional matching algorithm will be outlined.

RETE algorithm: The RETE algorithm is an algorithm for converting the rule condition part to a data flow graph which is called a RETE network before execution and for performing matching by sending fact data to this network. The condition to graph conversion is made by assuming each condition comparison as a network node and connecting the nodes for a comparison logical product or by arranging distribution nodes for distributing the fact flow for a logical sum. Comparisons among the comparisons of the rules, which can be shared, hold comparison nodes and a countermeasure for reducing the comparison count is taken. This algorithm matching is started by updating the fact data in the execution phase and carried out by sending the fact data to the network from the route and updating the internal status (past comparison results) of the network. Finally, the fact which reaches the lowest end of the network realizes the corresponding rule. This updating operation (matching phase) is performed by the following procedure. Firstly, the past comparison results in the network relating to the updated fact are deleted. Next, the comparison starts from the route part of tile network at he latest fact value. Each condition comparison which ends under one condition is made. When the comparison is correct, the fact data passes the node and is stored in an internal memory of the network which is called an alpha memory. To make a comparison spanning conditions next, the value is taken out of an alpha memory and the inter-condition comparison is made. This comparison result is stored in each comparison node (beta memory). In this case, the past matching results are stored in each node, so that only values which are newly stored in the alpha memory are compared. When the comparison is correct, the next node connected to the network is compared. When the comparison at each node is not correct, the fact flow is stopped. Finally, the fact which reaches the lowest end of the network realizes the corresponding rule. This matching algorithm reduces the comparison count and realizes high speed matching by (1) sharing of comparison nodes and (2) holding of past stored results as mentioned above.

TREAT algorithm: The above RETE algorithm stores intermediate comparison results in the network. However, when many facts are updated by rule execution, past matching results lose meaning and the cost for updating the held intermediate results increases. The TREAT algorithm has no beta memory and makes all comparisons spanning the conditions every inference cycle.

XC algorithm: The XC algorithm is a method which does not have either a beta memory or an alpha memory. This algorithm is effective particularly when the number of facts is small and many facts are updated every inference cycle.

The object of the parallel processing system is to speed up the processing and reduce the load. Parallel processing systems aimed at high speed inference are indicated, for example, in Bulletin of Information Processing Society of Japan (Vol. 30, No. 4, p. 486–494, 1989) and Japanese Patent Laid-Open No. 1-98026.

It is an object of the fault tolerant system and highly reliable system which are conventional concurrent processing systems to prevent the processing from stopping and improve the reliability of processing results. However, it is not an object to speed up the processing. The actual processing speed is not high.

On the other hand, the parallel processing system can speed up the processing and the speed-up degree depends on the algorithm. FIG. 9 shows the inference speed when the same data is processed in parallel using different inference algorithms by denoting the inference time in the horizontal axis and the inference cycle number in the vertical axis. As shown in FIG. 9, the inference speed varies with the inference algorithm type. However, it also varies with the inference stage in the same inference algorithm. This means that the inference algorithm at the maximum speed varies with the processing contents. In other words, in a parallel processing system using an algorithm, the processing speed is higher than that in other than the parallel processing but whether the speed is a highest one is uncertain.

SUMMARY OF THE INVENTION

An object of the present invention is to provide a concurrent processing method and system which can reliably realize maximum possible speed.

To accomplish the above object, the present invention contemplates a concurrent processing method in an information processing system having a plurality of processors and a shared memory which is shared by the processors, wherein a plurality of different algorithms for deriving the same processing result from the same data in each processor are set in the above plurality of processors and the same data is processed in parallel by each processor so as to derive processing results.

Each of the above plurality of processors may be each task of a multi-task system. More concretely in the present invention, according to the above concurrent processing method, when an algorithm derives a processing result first, the processing result is used and the processing by the other algorithms is stopped. Or, when an algorithm derives a processing result first, the processing result is used, and the processing by the other algorithms is interrupted, and the same data reflected by the above processing result data is obtained, and this data is processed in parallel using a plurality of different algorithms, and when an algorithm derives a processing result first, the processing result is used, and the processing by the other algorithms is interrupted, and this processing is repeated until it is stopped.

The present invention has a system structure including a plurality of processors for executing processing by different algorithms, local memories of the processors, a control processor, a shared memory for storing data to be processed, and a network for connecting them, wherein the above control processor loads the same data to be processed from the shared memory in the local memories of a plurality of processors and the above plurality of processors process the above data of the local memories to be processed in parallel and send the processing results to the above control processor.

In the above concurrent processing system, when a processor derives a processing result first, the control processor uses the processing result and stops the processing by the other processors. Or, when a processor derives a processing result first, the control processor uses the processing result, interrupts the processing by the other processors, obtains new data by reflecting the above processing result data to the local memories of all the processors, and then restarts the processing of all the processors on the basis of this data, and repeats this processing until it is stopped.

In the concurrent processing method and system of the present invention, given data is processed in parallel by a plurality of algorithms and the processing result which is derived first (in the shortest time) is used.

By doing this, the processing result can be obtained reliably at the maximum possible speed.

The foregoing and other objects, advantages, manner of operation and novel features of the present invention will be understood from the following detailed description when read in connection with the accompanying drawings.

BRIEF DESCRIPTION OF THE DRAWINGS

FIG. 2 is an illustration of knowledge representation of the concurrent inference system shown in FIG. 1.

DETAILED DESCRIPTION OF THE PREFERRED EMBODIMENTS

Next, the present invention will be explained more in detail using the embodiments shown in the accompanying drawings. The present invention, however, is not limited to such embodiments.

FIRST EMBODIMENT

Figure 1:
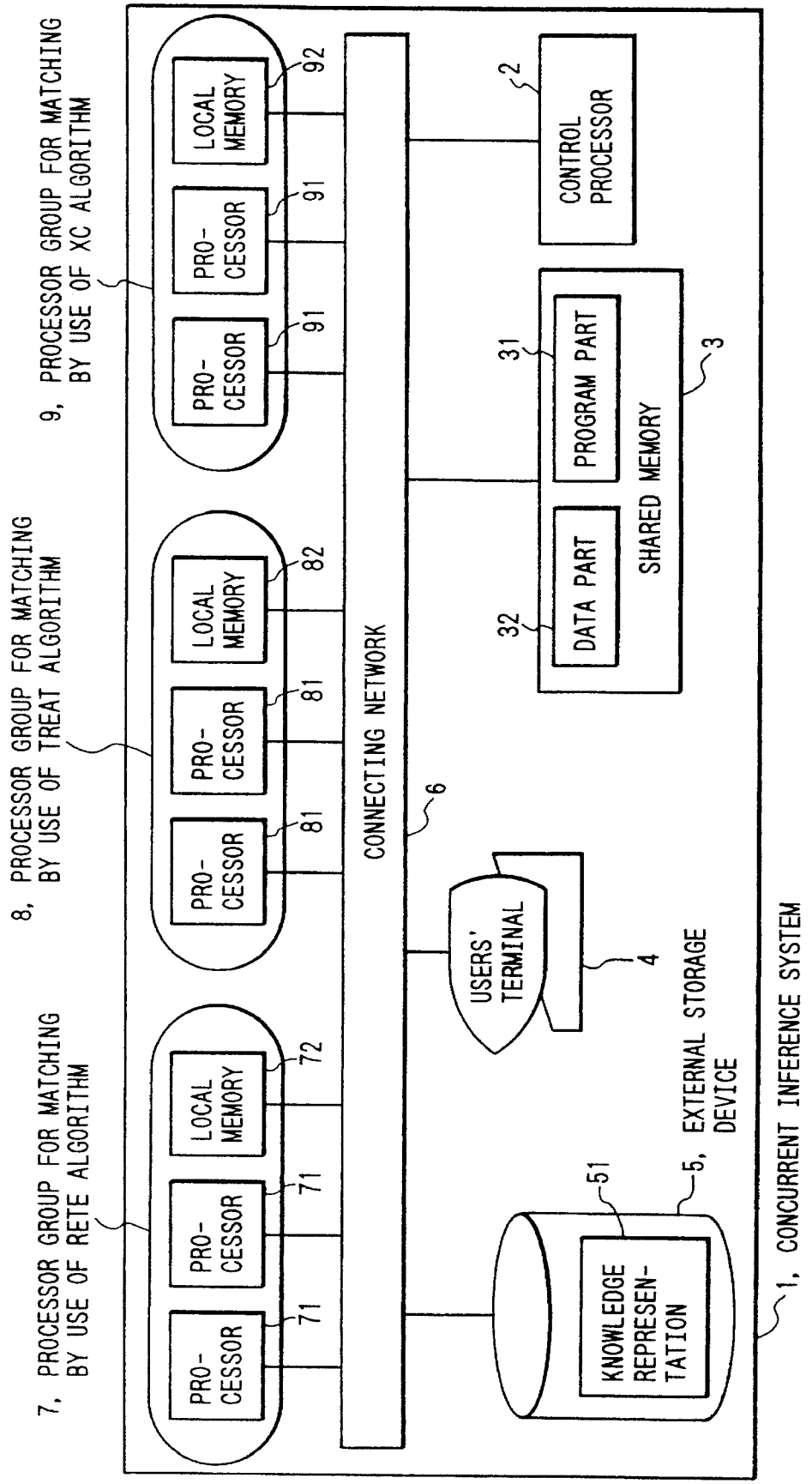
FIG. 1 is a block diagram of a concurrent inference system of the first embodiment of the present invention.

FIG. 1 is a block diagram of a concurrent inference system 1 shown in the first embodiment of the present invention.

This concurrent inference system 1 has a structure in which a control processor 2, a shared memory 3, a user terminal 4, an external storage device 5, a processor group for matching by use of RETE algorithm 7, a processor group for matching by use of TREAT algorithm 8, and a processor group for matching by use of XC algorithm 9 are connected to a connecting network 6.

The control processor 2 controls the concurrent progress of inference as described later.

The shared memory 3 stores the inference rule and inference control program in a program part 31 and facts which are data for inference in a data part 32.

The external storage device 5 stores knowledge representation 51 consisting of rules and facts.

The connecting network 6 is a network for transferring data and various instructions.

The processor group for matching by use of RETE algorithm 7 consists of two processors 71 and a local memory 72. The two processors 71 execute the program for matching by use of RETE algorithm stored in the local memory 72 in parallel.

The processor group for matching by use of TREAT algorithm 8 consists of two processors 81 and a local memory 82. The two processors 81 execute the program for matching by use of TREAT algorithm stored in the local memory 82 in parallel.

The processor group for matching by use of XC algorithm 9 consists of two processors 91 and a local memory 92. The two processors 91 execute the program for matching by use of XC algorithm stored in the local memory 92 in parallel.

FIG. 2 shows an example of the knowledge representation 51.

The knowledge representation consists of rule description 1000 and fact description 1003.

The rule description 1000 consists of a condition part 1001 where the realization condition is described and a then part where the contents, which are executed when the condition part 1001 is realized, are described.

Figure 3:
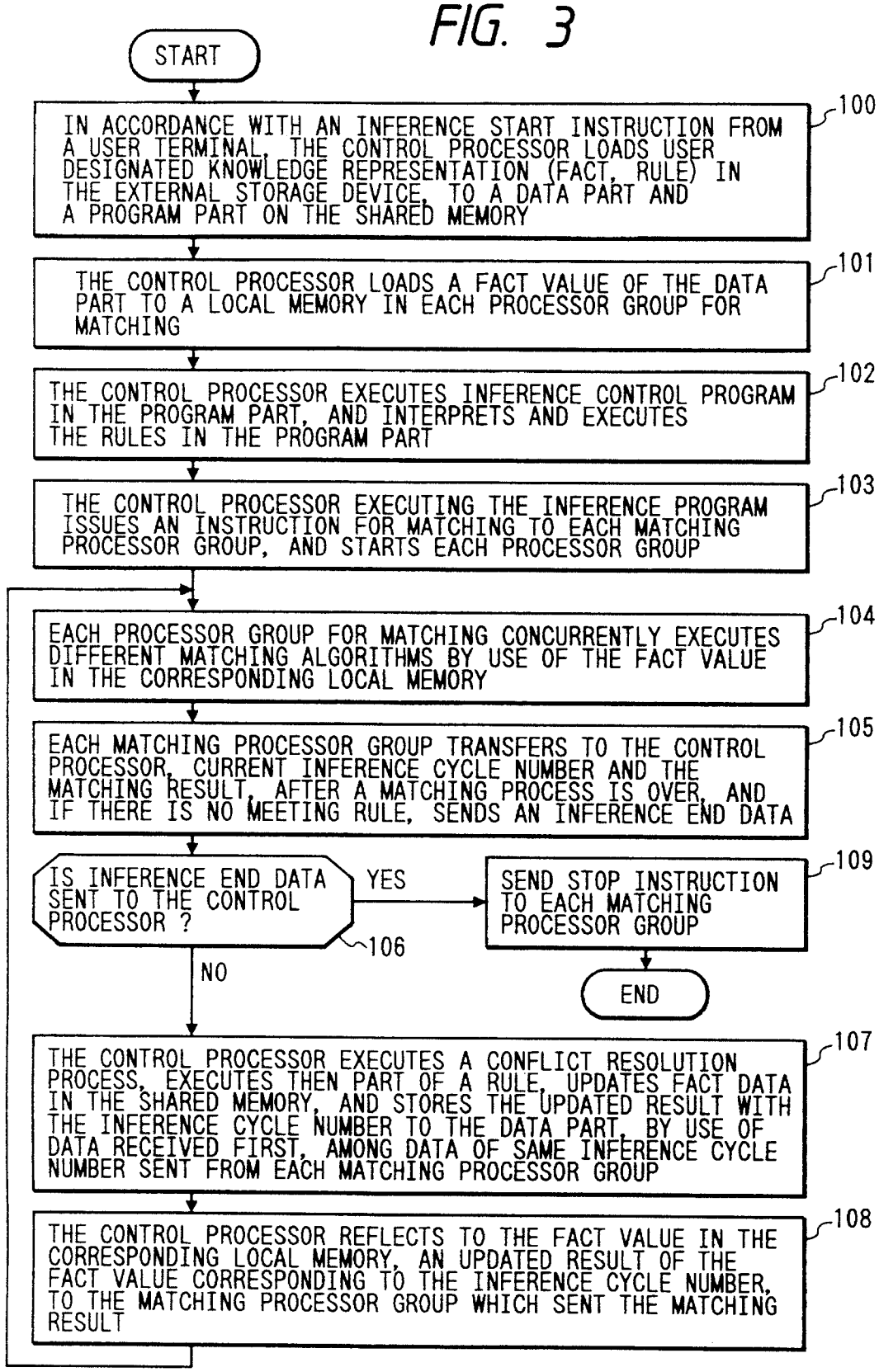
FIG. 3 is a flow chart showing operations of the concurrent inference system shown in FIG. 1.

FIG. 3 is a flow chart showing the processing procedure of the concurrent inference system 1.

At Step 100, in accordance with an inference start instruction from the user via the user terminal 4, the control procedure 2 loads the knowledge representation 51 in the external storage device 5 into the program part 31 and data part 32 of the shared memory 3.

At Step 101, the control procedure 2 loads a fact value in the data part 32 into the local memories 72, 82, and 92 of the processor groups for matching 7, 8, and 9.

At Step 102, the control processor 2 executes the inference control program stored in the program part 31 and interprets and executes the rule stored in the program part 31.

At Step 103, the control processor 2 issues a matching instruction to the processor groups for matching 7, 8, and 9 and activates them.

At Step 104, the processor groups for matching 7, 8, and 9 execute matching in parallel using the fact values in the local memories 72, 82, and 92. The matching in each of the processor groups for matching 7, 8, and 9 is parallel processed by the two processors.

At Step 105, the processor groups for matching 7, 8, and 9 transmit the current inference cycle numbers and matching results to the control processor 2 when one matching ends. When no rule to be realized is found, the above processor groups transmit the inference end data to the control processor 2.

At Step 106, the control processor 2 determines which processor group among the processor groups for matching 7, 8, and 9 from which the inference end data is sent and goes to Step 107 when no inference end data is sent or goes to Step 109 when the inference end data is sent.

At Step 107, the control processor 2 performs a conflict resolution process by use of the data received first among the data of the same inference cycle number among the inference cycle numbers and matching results sent from the matching processor groups 7, 8, and 9 and executes the then part in succession. According to this execution result, the control processor 2 updates the fact data in the shared memory 3 and stores the inference cycle number in the data part 32 of the shared memory 3.

At Step 108, the control processor 2 obtains updated results of the fact values corresponding to the sent inference cycle numbers for the matching processor groups 7, 8, and 9 which send the matching results and reflect them to the fact values of the corresponding local memories 72, 82, and 92 and returns to Step 104.

At Step 109, the control processor 2 sends a stop instruction to the matching processor groups 7, 8, and and ends operation.

Figure 4:
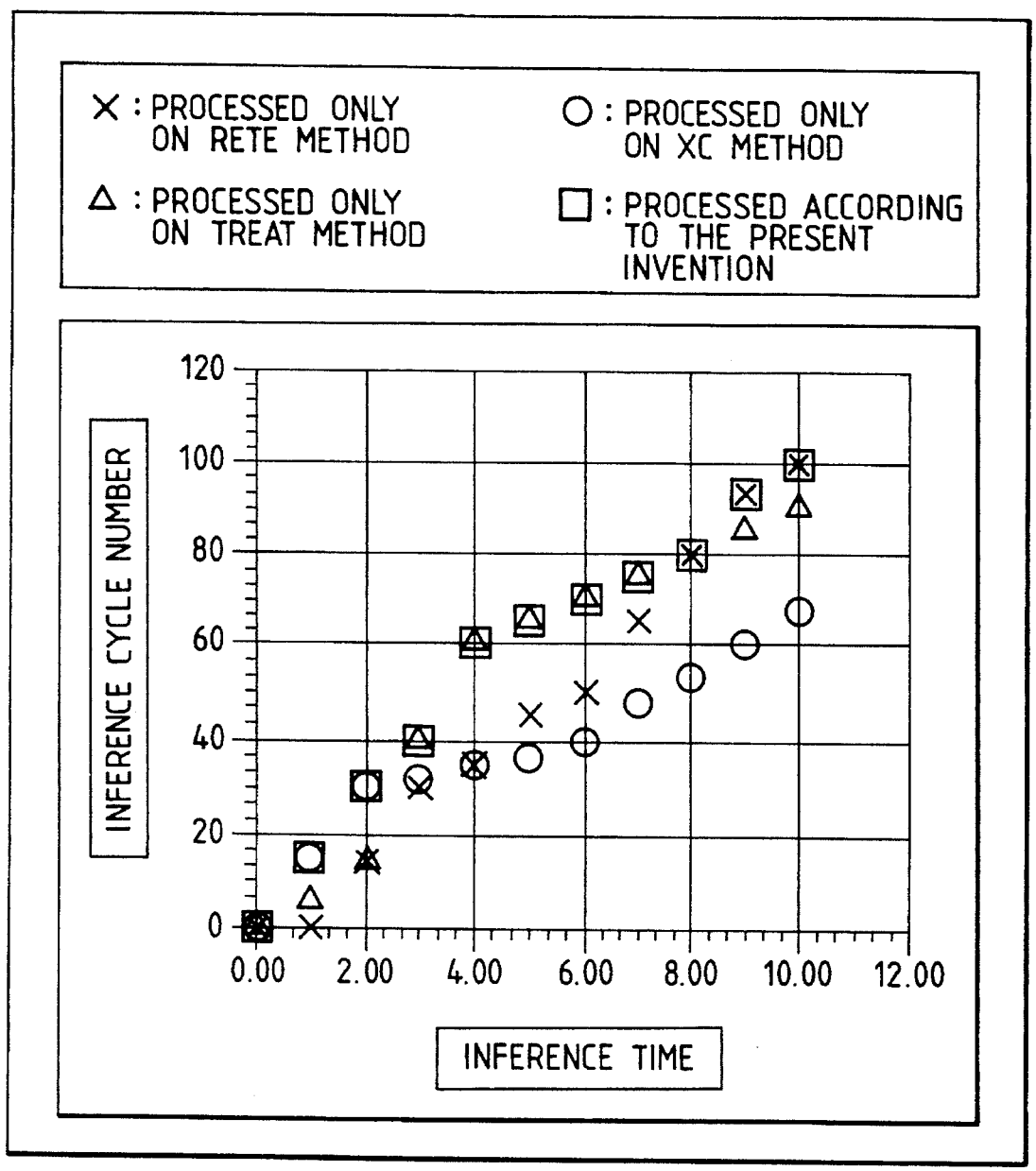
FIG. 4 is a graph showing the inference speed of the concurrent inference system shown in FIG. 1.

FIG. 4 shows the inference speed in the case of the above concurrent processing by denoting the inference time on the horizontal axis and the inference cycle number on the vertical axis. As shown in FIG. 4, the inference speed varies with the inference algorithm type. However, since the result of the inference cycle which most advances is always sent to the shared memory 3, the inference result at the highest speed can be obtained reliably.

SECOND EMBODIMENT

Figure 5:
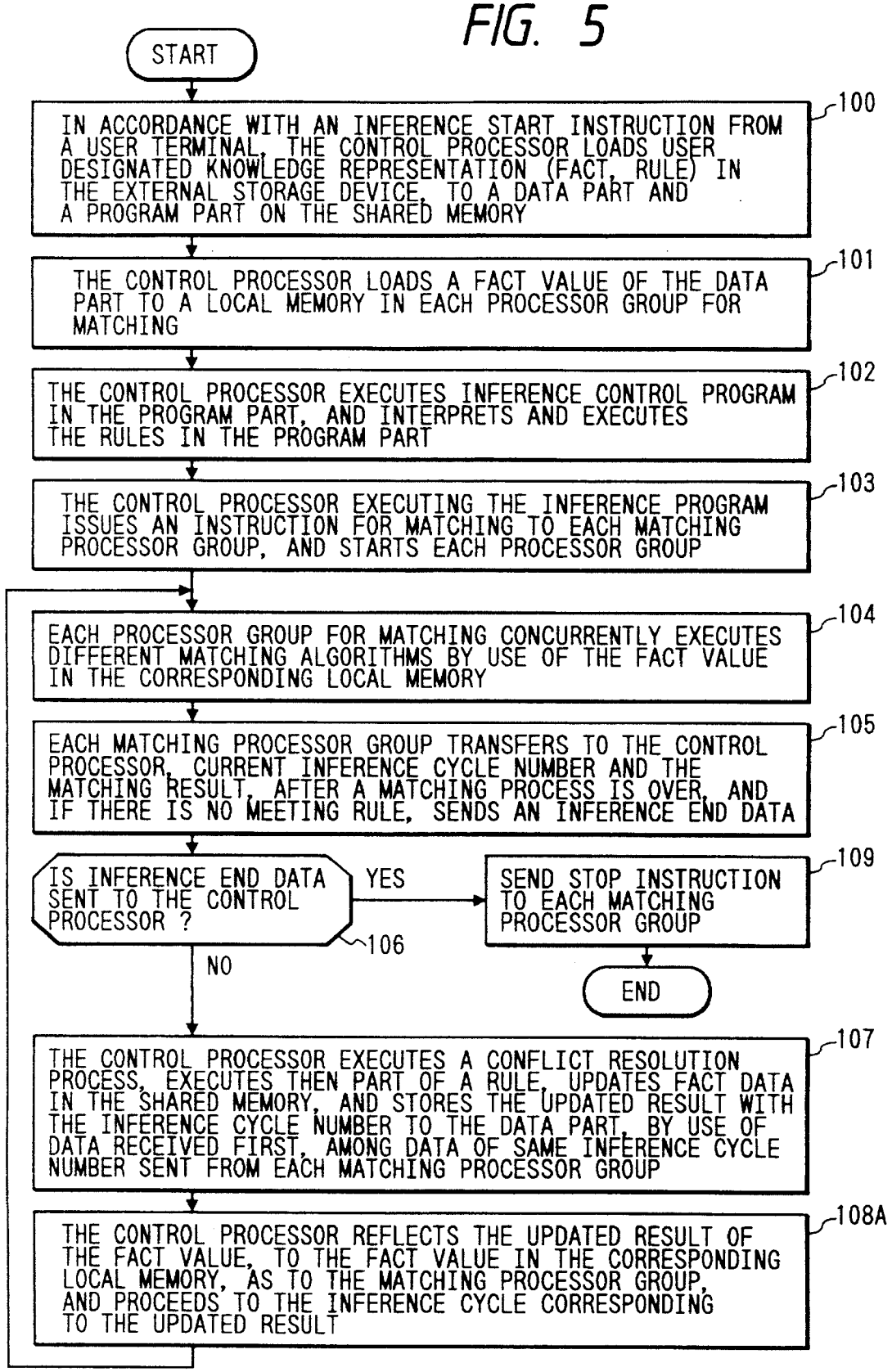
FIG. 5 is a flow chart showing operations of a concurrent inference system of the second embodiment of the present invention.

The second embodiment is similar to the aforementioned first embodiment except that the processing procedure shown in FIG. 5 is used instead of the processing procedure shown in FIG. 3. According to the processing procedure shown in FIG. 5, only Step 108A is different from the corresponding step shown in FIG. 3.

At Step 108A, the control processor 2 reflects the updated value of the fact value of the inference cycle, which most advances, to the fact values of the local memories 72, 82, and 92 and forces to advance the matching processor groups 7, 8, and 9 up to the inference cycle of the fact value and returns to Step 104.

Figure 6:
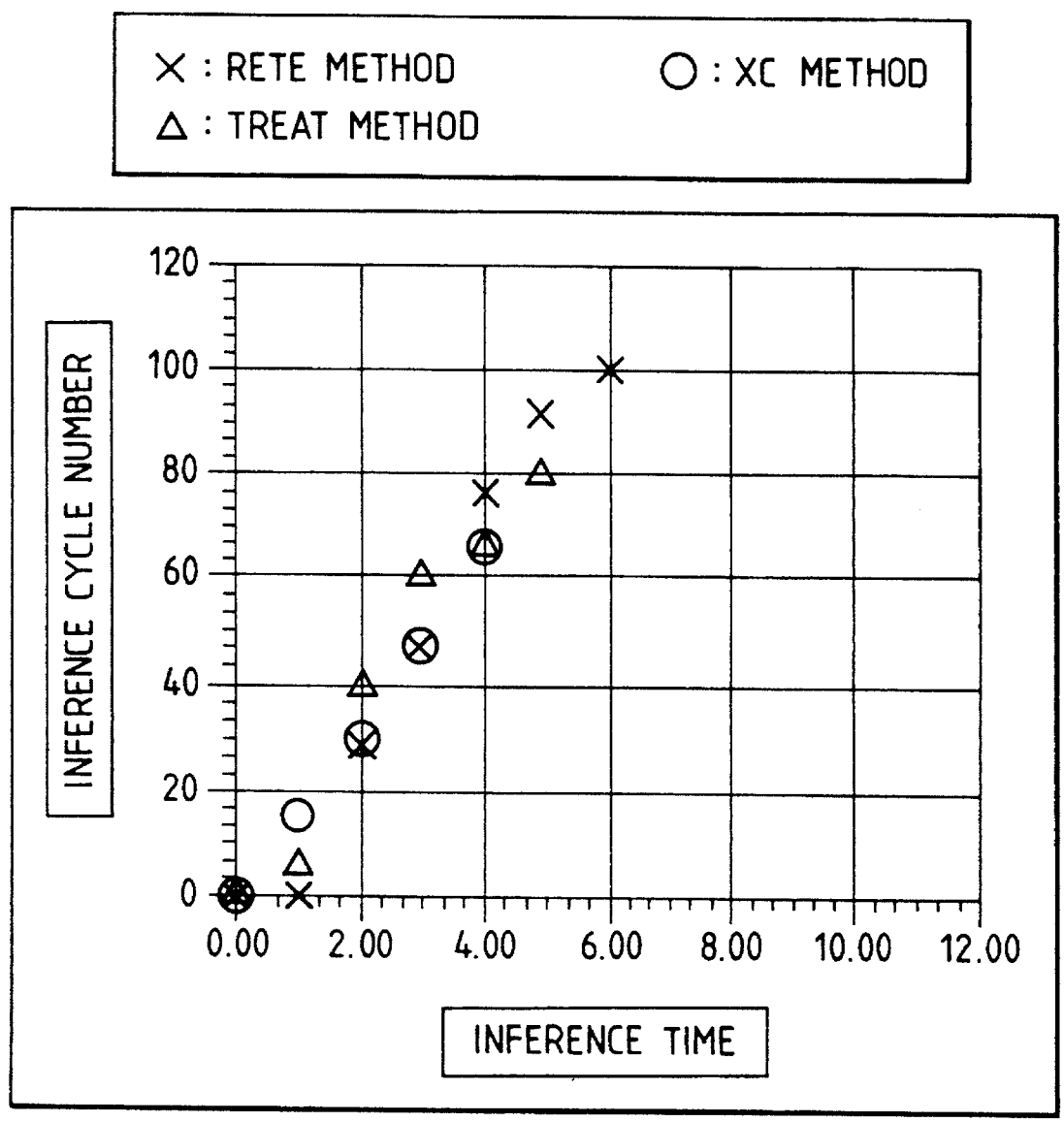
FIG. 6 is a graph showing the inference speed of the concurrent inference system shown in FIG. 5.

FIG. 6 shows the inference speed in the case of the above concurrent processing by denoting the inference time on the horizontal axis and the inference cycle number on the vertical axis. As shown in FIG. 6, the inference can be performed at the highest possible speed.

Therefore, when the inference contents or inference algorithm can force the inference cycles of the matching processor groups 7, 8, and 9 to advance, the second embodiment is desirable and when the inference contents or inference algorithm cannot force the inference cycles of the matching processor groups 7, 8, and 9 to advance, the first embodiment is desirable.

THIRD EMBODIMENT

Figure 7:
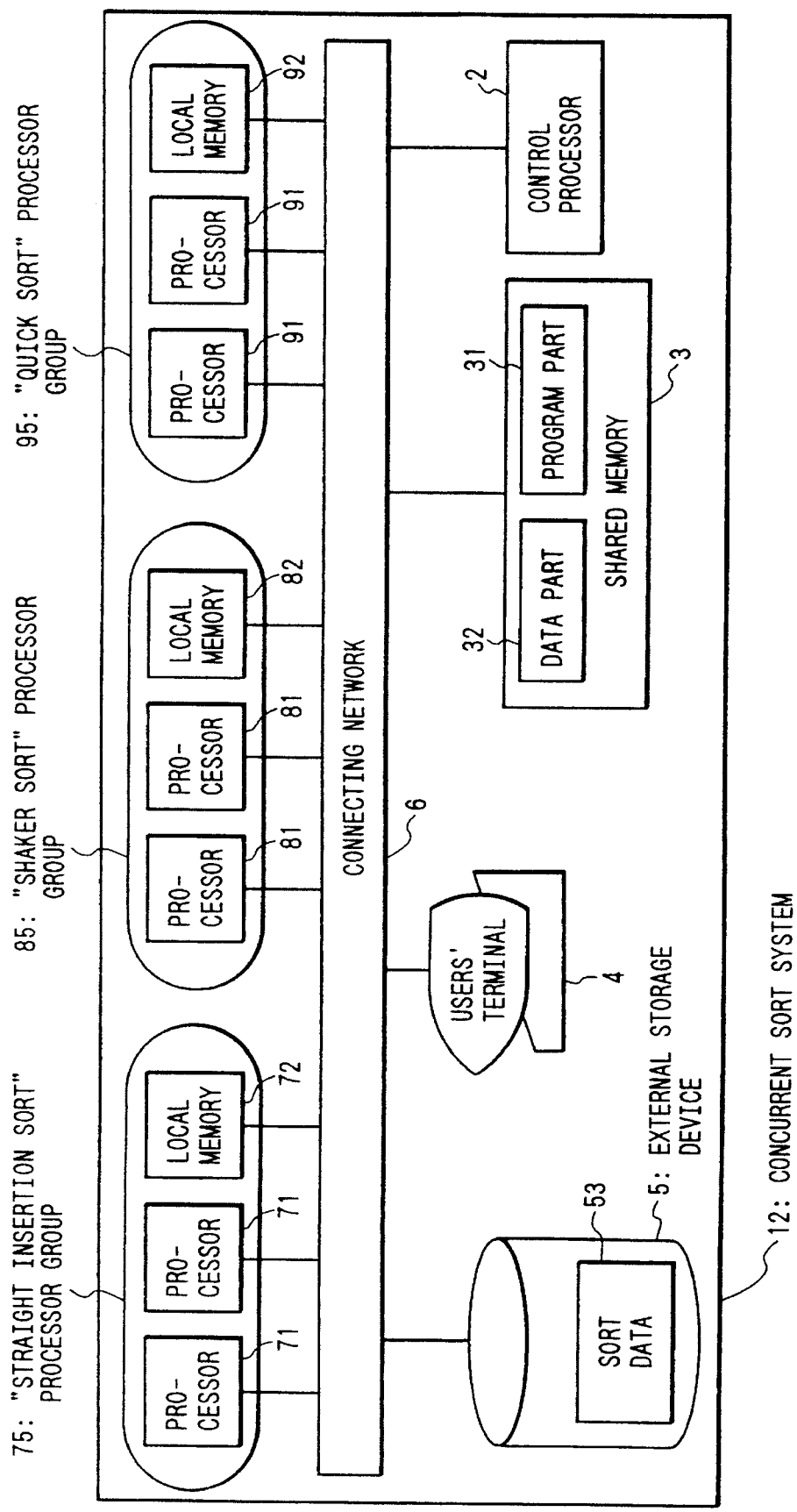
FIG. 7 is a block diagram of a concurrent sort system of the third embodiment of the present invention.

FIG. 7 is a block diagram of a concurrent sort system 12 shown in the third embodiment of the present invention.

The sorting algorithm used in this embodiment will be outlined hereunder.

The straight insertion sorting method is a method for dividing the target sorting columns to a[1], a[2], - - - , a[i1] and the source columns to a[i], a[i+1], - - - , a[n], for fetching the element at the "i"th source column at each step by increasing the number of i one by one starting at i=2, and for inserting it into an appropriate location of the target columns. The comparison calculation value is O (n^2). The shaker sorting method is a method for comparing the "i"th element and "i+1"th element up to n by increasing the number of i one by one starting at i=1 and for interchanging the elements when the sizes thereof are reverse. The sorting (bubble sorting) is performed by repeating it up to n times. According to this method, the processing is extended so as to be performed in both directions. The comparison calculation value is O (n^2). The quick sorting method is a method for dividing a sorting problem into partial problems and for integrating the result of each partial problem so as to sort the entire problem. The comparison calculation value is O (n).

This concurrent sort system 12 has a structure such that a control processor 2, a shared memory 3, a user terminal 4, an external storage device 5, a straight insertion sort processor group 75, a shaker sort processor group 85, and a quick sort processor group 95 10 are connected to a connecting network 6.

The control processor 2 controls the concurrent progress of sorting as described later.

The shared memory 3 stores the sort control program in a program part 31 and sort data in a data part 32.

The external storage device 5 stores sort data 53.

The connecting network 6 is a network for transferring data and various instructions.

The straight insertion sort processor group 75 consists of two processors 71 and a local memory 72. The two processors 71 execute the straight insertion sort processing program stored in the local memory 72 in parallel.

The shaker sort processor group 85 consists of two processors 81 and a local memory 82. The two processors 81 execute the shaker sort processing program stored in the local memory 82 in parallel.

The quick sort processor group 95 consists of two processors 91 and a local memory 92. The two processors 91 execute the quick sort processing program stored in the local memory 92 in parallel.

Figure 8:
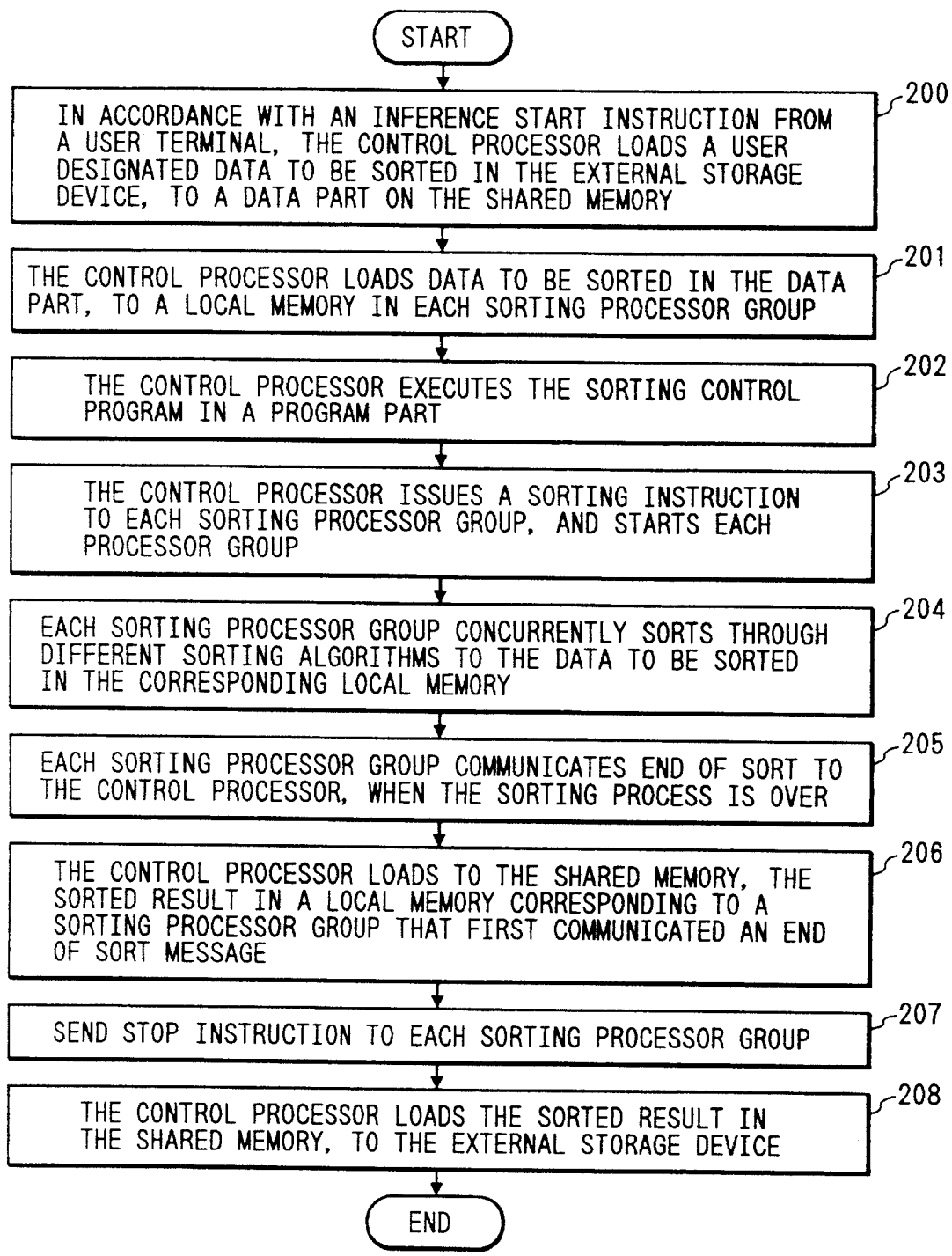
FIG. 8 is a flow chart showing operations of the concurrent sort system shown in FIG. 7.
Figure 9:
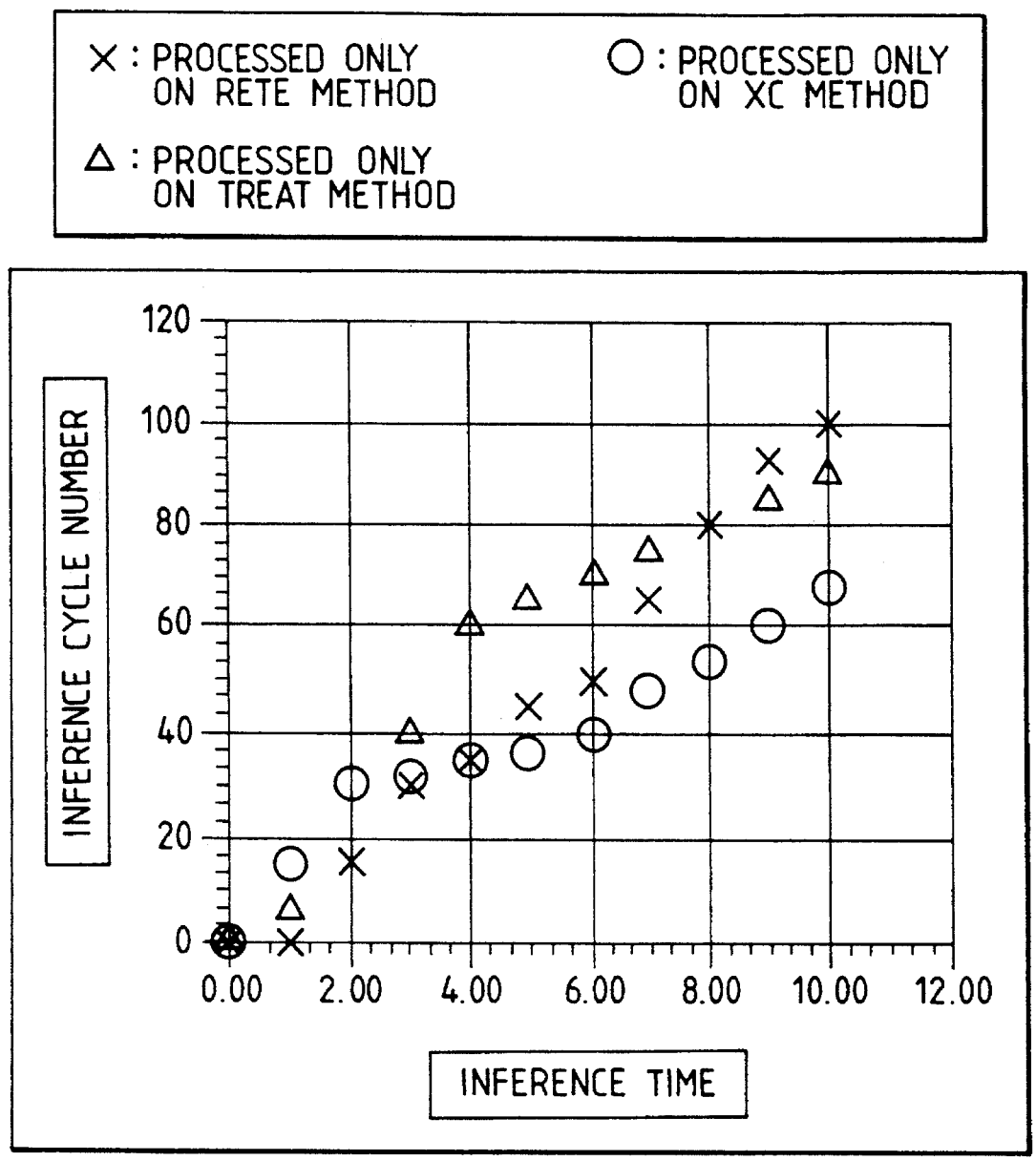
FIG. 9 is a graph showing differences in the inference speed depending on the algorithm.

FIG. 8 is a flow chart showing the processing procedure of the concurrent sort system 12. At Step 200, in accordance with a sort start instruction from the user via the user terminal 4, the control procedure 2 loads the sort data 53 in the external storage device 5 into the data part 32 of the shared memory 3.

At Step 201, the control procedure 2 loads the sort data in the data part 32 into the local memories 72, 82, and 92 of the sort processor groups 75, 85, and 95.

At Step 202, the control processor 2 executes the sort control program stored in the program part 31.

At Step 203, the control processor 2 which executes the sort control program issues a sorting instruction to the sort processor groups 75, 85, and 95 and activates them.

At Step 204, the sort processor groups 75, 85, and 95 sort the sort data in the local memories 72, 82, and 92 in parallel using different sort algorithms.

At Step 205, the sort processor groups 75, 85, and 95 inform the control processor 2 of sort end immediately after the sorting ends.

At Step 206, the control processor 2 loads the sort result in the local memory corresponding to the sort processor group, which transfers the sort end first, into the data part 32 of the shared memory 3.

At Step 207, the control processor 2 sends a stop instruction to the sort processor groups 75, 85, and 95.

At Step 208, the control processor 2 outputs the sort results in the shared memory 3 to the external storage device 5.

The sort algorithm speed varies with the sort data volume and property (close to nominal order, random, or close to inverse order). However, according to the aforementioned concurrent sort system 12, possible sort algorithms are all executed and a sort result which is obtained in the shortest time is fetched, so that sorting at the highest speed can be performed surely.

OTHER EMBODIMENTS

According to the first, second, and third embodiments, each processor group processes data in parallel using two processors. However, the number of processors is optional and only one processor may be used.

According to the first, second, and third embodiments, a plurality of processor groups 71, 81, and 91 execute processing by different algorithms in parallel. However, it may be executed practically in parallel by multi-task processing using a processor.

According to the first, second, and third embodiments, the processor groups 71, 81, and 91 are assumed as hardware. However, they may be constructed with software.

According to the first, second, and third embodiments, different algorithm processing programs are stored in the local memories. However, they may be stored in the shared memory 3.

According to the first, second, and third embodiments, the present invention is applied to inference and sorting. However, the present invention may be applied to data compression, simulation, and neurolearning.

According to the concurrent processing method and system of the present invention, given data is processed in parallel using a plurality of different algorithms and a processing result which is derived first is used, so that processing at the highest possible speed can be realized reliably.

What is claimed is:

1. A concurrent processing method in an information processing system having a plurality of processors and a shared memory which is shared by said processors, the method comprising:

a step of setting n each of said plurality of processors one of a plurality of matching algorithms for deriving a matching results for each of the plurality of matching algorithms, which algorithms are expected to derived a same matching result form an input knowledge representation which is input concurrently into the matching algorithms, said plurality of matching algorithms including at least two of a RETE matching algorithm, a TREAT matching algorithm, and an XC matching algorithm;

a step of parallel processing, as an inference cycle, said input knowledge representation concurrently with each of said matching algorithms, such that one of said matching algorithms derives the same matching result first; and, a step of outputting, as an output of said inference cycle, the same matching result of said one of the matching algorithms which derived the same matching result first.

2. A concurrent processing system comprising:

a plurality of matching processors for executing matching by different matching algorithms;

local memories in each of the matching processors;

a control processor;

a shared memory for storing fact expression and rule expression constituting knowledge representation; and a network for connecting the matching processors, the local memories, the control processor, and the shared memory;

wherein said control processor has;

1) means for loading a fact value of fact expression into the local memories of the plurality of matching processors from the shared memory, each of said plurality of matching processors having one of said different matching algorithms which are expected to derive same matching results from same fact values and means for a) performing the matching in an inference cycle in parallel with other processors, using the fact value in said local memories and b) sending the matching results having an inference cycle number and realized rule to said control processor when a rule which is realized is found as a result of matching, 2) means for sending inference end data to said control processor when no realized rule is found, 3) means for executing a conflict resolution process and a then part of said rule by use of a first received matching result among said matching results of the same inference cycle number, 4) means for obtaining updated results of the fact values corresponding to the inference cycle number sent from one of the matching processors from said shared memory 5) means for reflecting the updated results to the fact values of the corresponding local memory of one of the matching processors, 6) means for allowing the matching processors to execute the matching, and 7) means for sending a stop instruction to said matching processors so as to stop the matching when said inference end data is sent.

3. A concurrent processing system according to claim 2, wherein each of said processors has one or more processors.

4. A concurrent processing system comprising:

a plurality of matching processors for executing matching by different matching algorithms;

local memories in each of the matching processors;

a control processor;

a shared memory for storing fact expression and rule expression constituting knowledge representation data; and a network for connecting the matching processors, the local memories, the control processor, and the shared memory;

wherein said control processor has 1) means for loading a fact value of fact expression into the local memories of said plurality of matching processors from said shared memory, each of said plurality of matching processor having one of said different matching algorithms which are expected to derive same matching results form same fact values and means for a) performing the matching in an inference cycle in parallel with other processors, using the fact value in said local memories and b) sending the matching results having an inference cycle number and realized rule to said control processor when a rule which is realized is found as a result of matching 2) means for sending inference end data to said control processor when no realized rule is found, 3) means for executing a conflict resolution process and a then part of said rule by use of a first received matching result among said matching results of the same inference cycle number, 4) means for updating the knowledge representation data in said shared memory, 5) means for obtaining the fact value of the inference cycle which advances most from said shared memory, 6) means for reflecting the updated knowledge representation data to all the same fact values of the local memories of the matching processors, 7) means for allowing the matching processors to execute the matching after the inference cycle of the matching processors is forced to advance, and 8) means for sending a stop instruction to said matching processors so as to stop the matching when said inference end data is sent.

* * * * *